United States Patent
Rata et al.

(10) Patent No.: US 6,991,757 B2
(45) Date of Patent: Jan. 31, 2006

(54) CARING DOCTOR BLADE AND METHOD FOR MANUFACTURE OF SAME

(75) Inventors: Ilkka Rata, Jyväskylä (FI); Juhani Vestola, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 308 days.

(21) Appl. No.: 10/191,944

(22) Filed: Jul. 9, 2002

(65) Prior Publication Data

US 2002/0176934 A1   Nov. 28, 2002

Related U.S. Application Data

(62) Division of application No. 09/297,627, filed on May 4, 1999, now Pat. No. 6,416,843.

(30) Foreign Application Priority Data

Sep. 11, 1997 (FI) ...................................... 973659

(51) Int. Cl.
*B29C 65/00* (2006.01)
*B29C 67/00* (2006.01)
(52) U.S. Cl. .................... 264/136; 264/210.3; 264/275
(58) Field of Classification Search ................ 264/136, 264/210.3, 275
See application file for complete search history.

(56) References Cited

U.S. PATENT DOCUMENTS

| | | | | |
|---|---|---|---|---|
| 4,244,691 A | * | 1/1981 | Adam | ........................... 8/676 |
| 4,549,933 A | * | 10/1985 | Judd et al. | ................... 162/281 |
| 5,110,415 A | * | 5/1992 | Boucher et al. | ............ 162/281 |
| 5,174,862 A | * | 12/1992 | Hale et al. | ................... 162/272 |
| 5,408,720 A | * | 4/1995 | Miles | ....................... 15/256.51 |
| 5,662,041 A | * | 9/1997 | Kleist | ........................... 101/163 |

FOREIGN PATENT DOCUMENTS

JP    11170478 A  *  6/1999

* cited by examiner

*Primary Examiner*—Edmund H. Lee
(74) *Attorney, Agent, or Firm*—Steinberg & Raskin, P.C.

(57) ABSTRACT

A caring doctor blade for a paper/board machine having layers of fiberglass and carbon fibers, and a caring layer as a rigid laminated structure, where the caring layer has carbon fibers and grinding particles in direct proximity to the carbon fibers. The orientation of the fiberglass layers is parallel to the longitudinal axis of the blade. At least some of the layers that contain carbon fibers. The orientation of the carbon fibers is substantially diverging from the direction of the longitudinal axis of the blade. A method for manufacturing the doctor blade for a paper/board machine by a pultrusion method is also disclosed.

15 Claims, 1 Drawing Sheet

CARING DOCTOR BLADE AND METHOD FOR MANUFACTURE OF SAME

CROSS-REFERENCE TO RELATED APPLICATION

Figure 1:
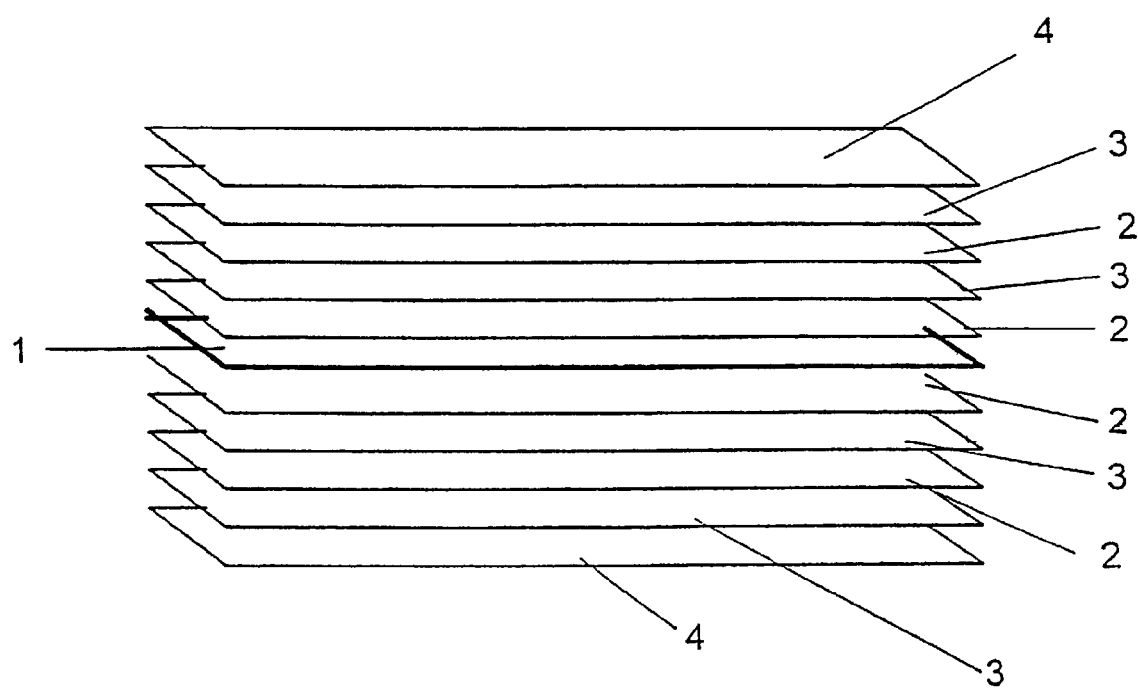

The present application is a divisional application of U.S. patent application Ser. No. 09/297,627 filed on May 4, 1999, now U.S. Pat. No. 6,416,843.

FIELD OF THE INVENTION

The invention concerns a caring doctor blade for a paper/board machine and a method for manufacture of same.

BACKGROUND OF THE INVENTION

The faces of the rolls in a paper/board machine tend to be coated with impurities coming from the process and with material of the doctor blade. For removal of these materials from the roll faces, doctor blades are employed.

Typical commercial blades are described, for example, in the U.S. Pat. No. 4,549,933 and in the U.S. Pat. No. 1,694,755.

In U.S. Pat. No. 4,549,933, a doctor blade for a paper machine is described, which consists of a number of alternating layers of fiber and carbon fiber so that the fiber layer may be composed of cotton, paper, fiberglass, or equivalent. Such a blade detaches contaminations, but, on the other, foreign material is separated from the blade onto the roll face.

In the U.S. Pat. No. 1,694,755, a doctor blade meant for cleaning of rolls and cylinders is described for use in pulp and paper industry. This blade is made of a composite material, in which, over the thickness of the blade, layers of fiber and fabric filler perpendicular to the blade edge alternate. This doctor blade is used for cleaning of the roll faces. Besides the fabric filler, for the doctor, carbon band, boron fiber or tungsten is used as fiber, and the alignment of the fibers is perpendicular to the direction of the blade.

None of said blade constructions contains particles of abrasive material.

In U.S. Pat. No. 5,174,862, a polishing doctor blade is described for polishing the metal face of a calender roll. The machining face placed at the head of the blade. comprises grinding particles mixed with an epoxy matrix, such as carbides or diamonds. The blade does not operate as a doctoring blade. It is meant exclusively for calender rolls, at which its function is exclusively to grind/polish the face of the calender roll.

In the FI Patent Application No. 941620, a method and an equipment are described for conditioning of the coating on a roll in a paper machine. What is concerned is not a doctor blade, but in the method of FI-941620 the roll is ground by means of a separate grinding rib to be attached to a doctor blade so as to correct the roughness of the roll face to make the face either smoother or rougher, as required. In such a case, the conditioning of the roll face takes place during a standstill on-site, i.e without removing the roll from the machine, but the device does not operate during production or at a production speed.

Coating with a foreign material often results in alteration of the surface properties of a roll, which again deteriorates the runnability and the properties of paper. If the coating is intensive, the roll face may become excessively smooth, which results, on a center roll in the press, for example, in more difficult separation of the paper web, passing of the web through the doctor, and, thus, in increased susceptibility of web breaks. Besides the coating effect, a second negative aspect in the case of metal blades is scratching of the roll face or, in some cases, penetration of the blade into the roll coating if a polymer-based coating is concerned. Also, excessive roughening of a roll face, which occurs with prolonged operation of metal blades, causes. deterioration of the operating capacity of the roll face.

Smoothing or roughening of a roll face is typical of a roll that contains ceramic coating material, but it also occurs with other coatings. The coating effect of the blades of reinforced plastic commonly employed with ceramic roll coatings mainly results from adhesion of particles detached from the blade by abrasion or from melting of the matrix plastic onto the roll face. On the other hand, materials coming from the process also adhere to the roll face, which materials cannot be removed by the doctor from the recesses in the roughness of the face, as the doctor cannot remove the layer of impurities deposited on these materials "anchored" on the bottom of said recesses either, because the adhesion is too strong.

Even the best conventional doctor blade cannot remove all the undesirable material already adhering to the roll face from the roll face, but the blade often brings more material to the roll face. This is why there has been a need to develop a doctor blade which removes undesirable contaminations or other material coated onto the roll face from the roll face to a greater extent than the blade itself brings onto the roll face and which doctor blade keeps the roll face in its original condition or restores it to its original condition.

OBJECTS AND SUMMARY OF THE INVENTION

The object of the present invention is a caring doctor blade for a paper/board machine, which blade removes undesirable coated material from the roll face and, at the same time, services the roll face, and a method for manufacture of such a blade.

By means of the solution that will be described in the following, the problems involved in the prior art solutions are avoided and the objectives that have been set are achieved. In the solution in accordance with the invention, in the caring doctor blade, an abrasive blade and an almost optimal, carbon-fiber reinforced composite blade of reinforced plastic are combined. The caring doctor blade is not supposed to be exclusively abrasive, as the conventional abrasive blades are, but it is also supposed to have excellent doctoring and cleaning properties. Thus, in the caring doctor blade, the functions of two different blade types are combined. It is an essential feature of the properties of the caring blade that the structure of the blade is of a correct sort. The blade is a carbon-fiber/fiberglass composite, which contains a grinding material in a layer that contains fiberglass or carbon fiber. The content of carbon fiber in the composite is high, the content of the matrix material is low, and the fiber orientation is optimal.

DETAILED DESCRIPTION OF THE INVENTION

The solution in accordance with the invention will be described in detail in FIG. 1, in which a preferred solution in accordance with the present invention is illustrated by way of example.

The doctor blade as shown in FIG. 1 comprises a rigid laminate structure consisting of fiberglass and carbon fiber layers 2 and 3 and at least one caring layer 1. The caring layer 1 is surrounded by fiberglass layers and possibly by carbon fiber layers.: Besides carbon fiber, the carbon fiber layers 3 may also contain fiberglass. In the fiberglass layers 2, the fiberglass layers are orientated parallel to the longitudinal axis of the blade, and in at least some of the layers that contain carbon fiber, the carbon fibers are orientated substantially obliquely to the longitudinal axis of the doctor blade, preferably transversely to the blade direction. The topmost layers 4 are preferably mats with fiberglass surface.

The caring layer 1 comprises carbon fibers and grinding particles in direct vicinity of the carbon fibers, possibly additionally also glass fibers. As the grinding particles, it is possible to employ silicon carbide particles, diamond, boron nitride, aluminum oxide, or equivalent, the preferable one being silicon carbide. In the layer, there may be grinding particles across the entire width of the blade, but they can also be placed differently, for example at the edge of the blade that enters into contact with the roll. The grinding particles have been introduced into connection with the carbon fibers, for example, by impregnating into a carbon fiber fabric by means of a matrix material, which can be thermosetting or thermoplastic resin, and its basic matrix can be fluorinated.

In order that a suitable caring grinding effect could be obtained, the nature of the grinding agent (silicon carbide, diamonds, boron nitride, aluminium oxide, or equivalent; preferably silicon carbide) and the particle size (30 . . . 250 $\mu$m; preferably 45 . . . 125 $\mu$m) and the amount of particles on the wear face placed against the roll are chosen appropriately. The amount can be changed by adjusting the density of particles in the layer and/or by increasing the number of the layers that contain particles, for example 1 . . . 5 layers. The duration of the grinding effect can be regulated by fitting the particles on a certain distance within the wear margin only. In this way the grinding effect can be standardized in the cross direction of the whole roll even if the rate of wear of the blade in different areas wear differently. When expensive grinding materials are used, it is preferable to place the particles in the area of the wear margin only.

The thickness of the doctor blade is preferably about 1.3 . . . 2.8 mm, while the thicknesses of the individual layers are of an order of about 0.1 . . . 0.3 mm, the caring layer about 0.1 . . . 0.4 mm. The doctor blade is manufactured preferably by means of a pultrusion method. In such a case, the grinding material is brought into connection with the carbon fiber fabric, for example impregnated into said fabric, before the pultrusion stage. Also, conventional methods known from the manufacture of sandwich constructions can be employed.

The higher the content of carbon fiber in the doctor blade of reinforced plastic is in relation to fiberglass and in particular in relation to matrix plastic, the slower is the covering of the roll face with plastic or the coating of the roll face at least in respect of the material separated from the blade. The case is also affected by how optimal the fiber orientation in the blade is and how good the resistance to heat of the matrix is. Favorably the matrix materials are thermosetting or thermoplastic resins that endure a temperature higher than 200° C. Longitudinal glass fibers and possible carbon fibers give the structure the necessary robustness and rigidity in the longitudinal direction.

From the point of view of the operability of the blade, it is important that the grinding, hard particles, for example silicon carbide, are surrounded by carbon fiber. The function of the carbon fiber is to conduct the arising friction heat away from the grinding particles so that the matrix material around the particles of grinding material does not burn or melt, with resulting removal of the grinding particles. A substantially cross-direction orientation of the carbon fibers provides good conductivity of heat away from the tip of the blade, i.e. away from the matrix which constitutes the fixing agent for the grinding material and from the particles of grinding material, in which case the melting of the matrix is reduced. Further, the rigidity of the blade in the cross direction is high, which improves the doctoring result. The blade is, however, resilient in the longitudinal direction of the blade, in which case the blade follows the roll face and complies with the roll face well over the entire length of the blade. Such a doctor blade operates excellently as a shearing blade, in addition to the abrading effect; a conventional abrasive blade cannot cut off the impurities. Thus, by means of a single blade, a multiple effect is obtained, which provides evident advantages also in a case in which, on the rolls, both a grinding blade and a shearing blade can be used separately in a doctor.

We claim:

1. A method for constructing a doctor blade for removing impurities from a roll face of a roll in a paper/board machine, comprising the steps of:
   molding a laminated structure having a plurality of fibrous layers, wherein at least one layer is made of carbon fiber or substantially containing carbon fiber, and in which layer the orientation of the carbon fibers is substantially diverging from the direction of the longitudinal axis of the blade, and is optionally in the cross direction of the blade, and wherein said at least one layer contains grinding particles for roughening or smoothing the roll face, said grinding particles being surrounded by said carbon fibers for conducting heat away from said grinding particles.

2. The method of claim 1, further comprising the step of:
   adjusting a grinding effect of the grinding particles operatively provided by the doctor blade by selecting a size and amount of grinding particles being impregnated into the layer.

3. The method of claim 1, further comprising the step of:
   orienting the carbon fibers in a direction substantially diverging from a direction of a longitudinal axis of the doctor blade.

4. The method of claim 1, wherein the grinding particles are selected from the group consisting of silicon carbide, diamond, boron nitride and aluminum oxide.

5. The method of claim 1, wherein the grinding particles are impregnated into the fabric of carbon fiber by means of a matrix material, said matrix material being one of a thermosetting and thermoplastic resin.

6. The method of claim 1, wherein the grinding particles are placed at an edge that enters into contact with the roll.

7. The method of claim 1, wherein the layer of carbon fiber that contains grinding particles has been surrounded with layers of fibreglass and carbon fiber, in which layers the directions of orientation of the glass fibers are substantially parallel to the longitudinal axis of the blade, and in which layers the directions of orientation of the carbon fibers are substantially diverging from the direction of the longitudinal axis of the blade.

8. The method of claim 1, wherein the grinding particles have a size from 30 to 250 $\mu$m.

9. The method of claim 1, wherein the grinding particles have a size from 45 to 125 $\mu$m.

10. The method of claim 1, wherein the plurality of fibrous layers includes at least one caring layer; of carbon fibers said at least one caring layer further comprises a matrix material, said grinding particles being impregnated into the fabric of said carbon fibers of the at least one caring layer by means of said matrix material.

11. The method of claim 10, wherein said matrix material is made from a thermosetting resin or a thermoplastic resin.

12. The method of claim 11, wherein said thermosetting resin is fluorinated.

13. The method of claim 11, wherein said thermoplastic resin is fluorinated.

14. The method of claim 10, wherein said matrix material is fluorinated.

15. The method of claim 10, wherein said grinding particles are placed at an edge of said at least one caring layer.

* * * * *